United States Patent [19]
Marsh

[11] Patent Number: 5,331,150
[45] Date of Patent: Jul. 19, 1994

[54] PHOTOELECTRIC SENSOR WITH VARIABLE LIGHT PULSE FREQUENCY

[75] Inventor: Brian J. Marsh, Stephenson County, Ill.

[73] Assignee: Honeywell Inc., Minneapolis, Minn.

[21] Appl. No.: 49,940

[22] Filed: Apr. 20, 1993

[51] Int. Cl.[5] .............................................. G01V 9/04
[52] U.S. Cl. .............................. 250/222.1; 250/223 R
[58] Field of Search ................. 250/221, 222.1, 223 R, 250/561; 340/555, 556, 557

[56] References Cited

U.S. PATENT DOCUMENTS

| 4,267,443 | 5/1981 | Carroll et al. ....................... 250/221 |
| 5,115,129 | 5/1992 | Johnson . | |
| 5,250,801 | 10/1993 | Grozinger et al. ................ 250/222.1 |
| 5,262,636 | 11/1993 | Rink ..................................... 250/221 |

Primary Examiner—David C. Nelms
Assistant Examiner—K. Shami
Attorney, Agent, or Firm—William D. Lanyi

[57] ABSTRACT

A photosensor is provided with a control circuit that is capable of varying the frequency of light pulses which energize a light source of the sensor. When four consecutive light pulses result in an identical status of a light sensitive component, the frequency of light pulses is slowed to conserve energy. However, when a change in state is recognized by the circuitry of the present invention, the frequency of light pulses is increased in order to more rapidly determine whether or not a change of status has actually occurred. This permits the photoelectric sensor to conserve energy while also being able to rapidly determine whether or not the light path of the photoelectric sensor has changed state from obstructed to unobstructed or, conversely, from unobstructed to obstructed.

14 Claims, 4 Drawing Sheets

PHOTOELECTRIC SENSOR WITH VARIABLE LIGHT PULSE FREQUENCY

BACKGROUND OF THE INVENTION

1. Field of the Invention

The present invention relates generally to photoelectric sensors and, more specifically, to a circuit for a photoelectric sensor which provides a series of light pulses and changes the frequency of the light pulses in response to a change in the status of a light sensitive component of the photoelectric sensor.

2. Description of the Prior Art

Photoelectric sensors are well known to those skilled in the art. Many different types of photoelectric sensors and sensor applications have been used to monitor the movement of objects. As is known to those skilled in the art, photoelectric sensors can be provided with a means which pulses a light source to create a series of light pulses emanating at a preselected frequency from a light source, such as a light emitting diode. The pulsing of the light source is coordinated with a light sensitive component, such as a photodiode, so that the receipt of a light pulse by the light sensitive component can be coordinated with the timing of the energization of the light source. The purpose of this coordination is to provide the ability to distinguish the receipt of a legitimate light pulse from the receipt of background light emanating from some external source. If a light pulse is received by the light sensitive component coincidently with the transmission of a light pulse from the light source, related electronic circuitry is configured to accept the light pulse as indicating an unobstructed path between the light source and the light sensitive component. In certain applications, the light source is disposed within a first housing and the light sensitive component is disposed within a second housing. Alternatively, the light source and the light sensitive component can be disposed within a common housing and a reflective object can be used to receive light emanating from the light source and reflect light it back toward the light sensitive component within the same housing. The particular application of the photosensor which incorporates the present invention is not limiting the circuitry described below in relation to the preferred embodiment of the present invention.

U.S. Pat. No. 5,115,129, which issued to Johnson on May 19, 1992, describes a photoelectric sensor which comprises a light emitting diode and a light sensitive component disposed within a common housing. The housing is provided with a light transmissive end portion that is formed to provide one or more lenses. The lenses are formed as an integral part of the housing structure in order to facilitate manufacture and avoid the need for sealing components to prevent leakage into the housing when the photoelectric sensor is used in harsh duty applications that require washdown with high velocity fluids.

SUMMARY OF THE INVENTION

In a preferred embodiment of the present invention, a photoelectric sensor comprises a light source and a means for causing the light source to be energized and deenergized at a preselected rate in order to provide a serious of light pulses emanating from the light source. A light sensitive device is disposed in light transmission relation with the light source and a means is provided for determining whether the light sensitive device is receiving a light pulse when the light source is energized. The determining means has an output signal which is representative of a coincident receipt of a light pulse when the light source is energized. A preferred embodiment of the present invention also comprises a means for changing the preselected rate in response to a change of the output signal during one energization of the light source from the output signal during a previous energization.

By providing the ability to change the frequency of light pulses emanating from the light source in a photoelectric sensor, a relatively low frequency of light pulses are used to conserve energy when no change in light beam status is apparent. However, when a change is sensed in the status of the light beam path, the frequency of the light pulses can be increased to more rapidly determine whether or not the actual status of the light path has changed from unobstructed to obstructed or, alternatively, from obstructed to unobstructed. By providing this characteristic, the present invention conserves energy while maintaining the ability to make a rapid determination during a change of status condition in the light path.

As will be described in greater detail below, the present invention provides a photoelectric sensor with a means for generating a serious of electrical pulses and a means for energizing a light source in response to each one of the series of electrical pulses. In addition, the present invention comprises a means, disposed in light relation with the light source, for receiving light pulses from the light source coincident with the electrical pulses. It also comprises a means for storing a preselected number of sequential output signals from the receiving means in which each of the output signals is representative of the presence or absence of incident light on the receiving means coincident with one of the electrical pulses. To provide the advantages described above, the present invention comprises a means for changing the frequency of the series of electrical pulses in response to a change of the preselected number of sequential output signals.

BRIEF DESCRIPTION OF THE DRAWINGS

The present invention will be more fully and clearly understood from a reading of the Description of the Preferred Embodiment in conjunction with the drawings, in which.

DESCRIPTION OF THE PREFERRED EMBODIMENT

Figure 1:
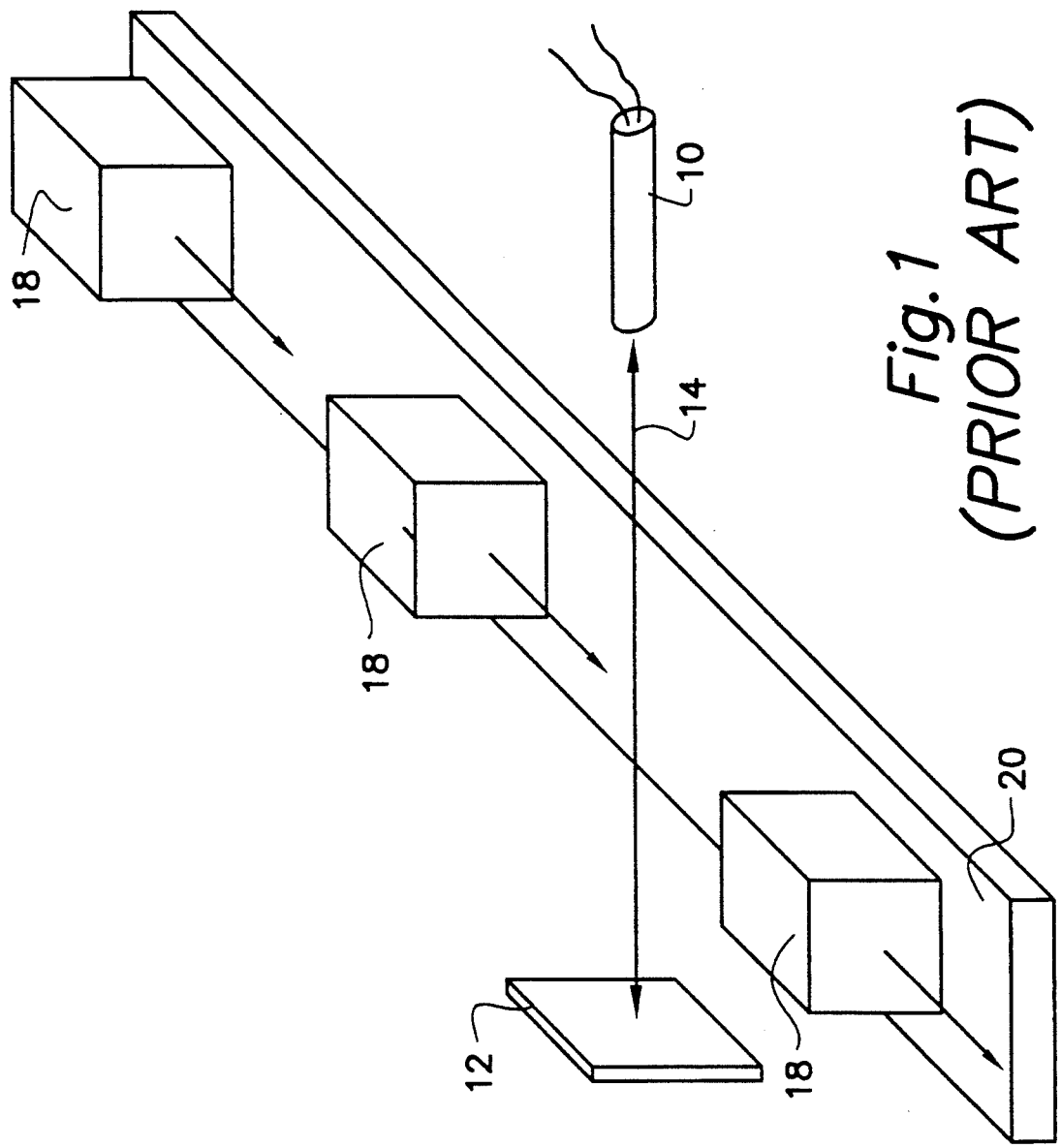
FIG. 1 illustrates a typical application of a photoelectric sensor which is applied in a retroreflective configuration.

Throughout the Description of the Preferred Embodiment, like components will be identified by like reference numerals. If FIG. 1, a photoelectric sensor 10 is associated with a reflective component 12 so that a light path 14 is defined. If the photoelectric sensor 10 is a retroreflective device, it comprises a light source and a light sensitive component within a common housing. The light source causes a light to be generated in a direction away from the housing. In other words, the light would emanate from the light source 10 in a direction toward the reflective object 12 along the light path 14. When the light is reflected by the reflective object 12, it returns toward the photoelectric sensor 10 and is received by a light sensitive component disposed within the housing of the sensor. In the arrangement shown in FIG. 1, a series of objects 18 are disposed on a conveyor 20 which causes the objects 18 to move in a direction as indicated by the arrows. If no object 18 is disposed at a position between the photoelectric sensor 10 and the reflective object 12, an unobstructed light path 14 exists and light emanating from a light source within the housing is reflected back toward the light sensitive component within the housing and an appropriate signal is provided upon receipt of a light pulse which is coincident with the energization of the light source. If, on the other hand, an object 18 moves between the photoelectric sensor 10 and reflective object 12, the light path 14 is obstructed and no return light signal is received. In an arrangement such as that shown in FIG. 1, the photoelectric sensor 10 can provide a signal which represents the obstruction or lack of obstruction of the light path 14 and therefore indicate the presence of an object 18 at a position between the photoelectric sensor 10 and the reflective object 12.

In order to avoid the interference that could otherwise be cause by external light sources which could possibly generate light in a direction toward the photoelectric sensor 10, it is well known that the light source within the housing of the photoelectric sensor can be energized and deenergized periodically to create a series of light pulses rather than a constant light beam. The purpose of this pulsation technique is to coordinate the light sensitive component with the light source in such a way that the light sensitive component only acknowledges receipt of light if the light is received coincidently with the energization of the light source. In this way, the circuitry within the photoelectric sensor can distinguish light which arrives at the light sensitive component at the proper time from spurious light signals emanating from external sources. As is well known, the frequency and duration of the light pulses emanating from the light source within a photoelectric sensor will determine the power consumption of the sensor. If the frequency of light pulses is reduced, less power is consumed. However, if the frequency of light pulses is reduced, the speed at which the presence or absence of an object in the light path can be determined is also slowed.

With continued reference to FIG. 1, it is well known to those skilled in the art that the determination that an object is in the light path is generally not based upon a single receipt of a light pulse by the light sensitive component or a single absence of receipt of a light pulse when one is expected. In order to increase the certainty that the presence or absence of a received light pulse actually indicates the unobstructed or obstructed light path, it is common to provide appropriate circuitry which requires a preselected number of sequential identical statuses of the light sensitive component in order to determine whether or not the light path is obstructed. In other words, when an object 18 moves into obstructing relationship with the light path 14, the photoelectric sensor 10 typically will not indicate the presence of the object based upon a single absence of a light pulse when one is expected. Instead, it is more common to require a plurality of consecutive absences of received light pulses before such a determination is made. Similarly, as an object 18 passes out of obstructing relation with the light path 14, the receipt of a single light pulse is not sufficient to make the determination that the light path 14 is unobstructed. Instead, it is common to require a plurality of consecutively received light pulses before this determination is made. If the frequency of light pulses is reduced in order to conserve energy, the speed at which an object 18 can be identified will be significantly reduced since the time duration of the required plurality of consecutive pulses will be longer if the frequency is less. The present invention is directed to avoid this disadvantageous result while also permitting the frequency of light pulses to be reduced in order to conserve energy.

Figure 2:
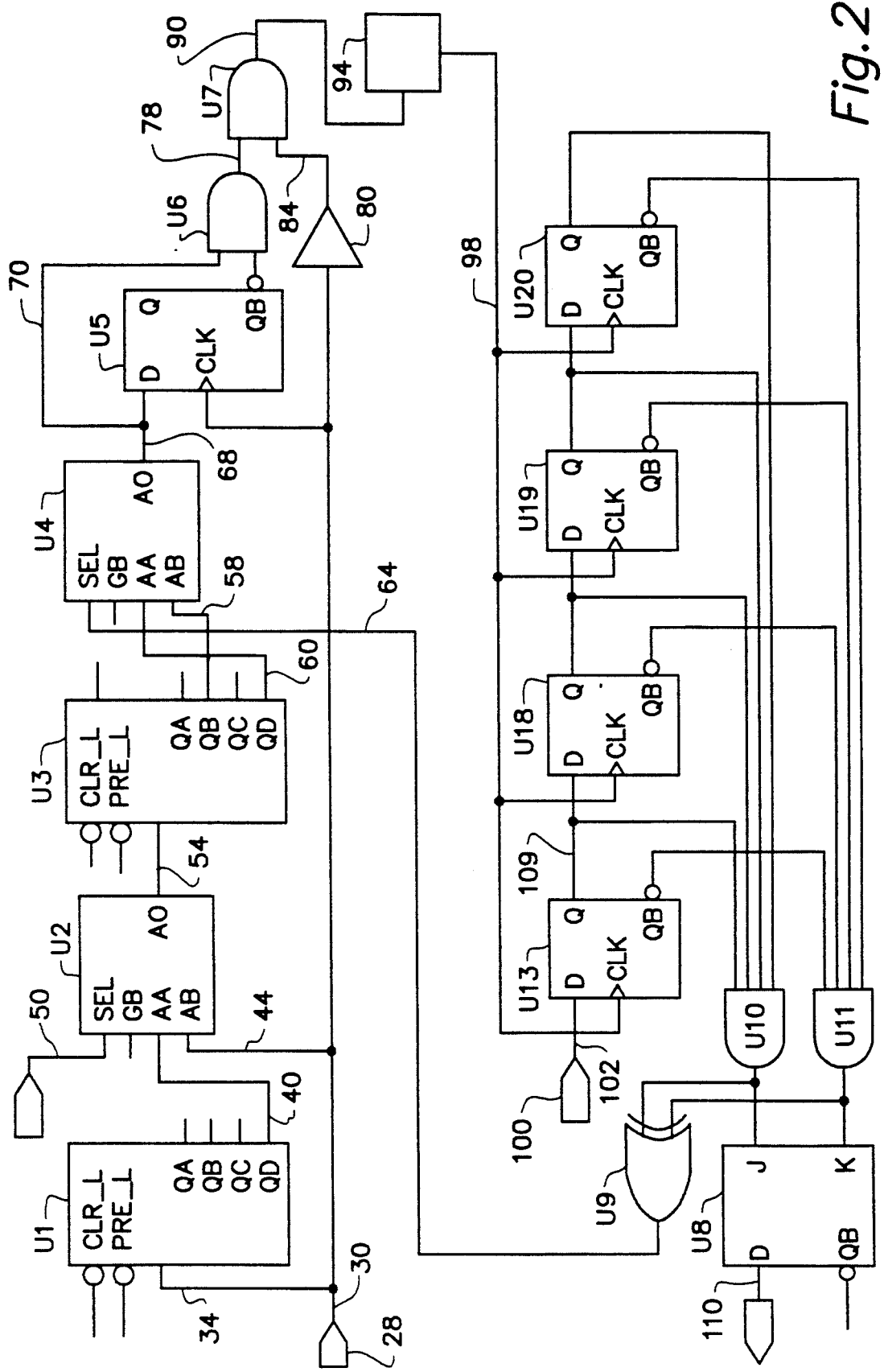
FIG. 2 illustrates an exemplary circuit to perform the function of the present invention.

FIG. 2 illustrates an exemplary circuit which can be used to provide the advantages of the present invention. A clock source 28 provides a series of squarewave pulses. In a preferred embodiment of the present invention, the frequency of the clock source 28 is 128 KHz. These pulses are imposed on line 30. Line 30 is connected by line 34 to a frequency divider component U1. The output of component U1, one line 40, provides an 8 KHz signal to the AA input of a multiplexer U2.

The multiplexer U2 is provided with two inputs, on lines 40 and 44, of 8 KHz and 128 KHz, respectively. The multiplexer U2 is provided with a select input, on line 50, which permits the manual selection of either one of the two input frequencies. Based on the status of the select line 50, the output of multiplexer U2 on line 54 is equal in frequency to the selected input. Line 54 is provided as an input to another frequency dividing device U3. Output QB from device U3 provides a squarewave signal to the AB input of multiplexer U4 which is one-fourth of the frequency of the signal on line 54. In addition, the QD output of device U3 provides, on line 60, a squarewave output to input AA of multiplexer U4 which is one-sixteenth of the frequency of the signal on line 54. This permits the circuit in FIG. 2 to select between a slow clock on line 60 and a fast clock on line 58 as will be described in detail below.

Multiplexer U4 has a select input connected to line 64. The operation of this input will be described below in conjunction with the EXCLUSIVE-OR component U9. Based on the status of the select input of multiplexer U4, the output of the multiplexer will provide either a fast or slow frequency squarewave on line 68. The signal on line 68 is connected directly to the input of flip-flop U5 and, on line 70, is connected to the AND gate U6. The clock input of flip-flop U5 is connected directly to line 30 which transmits the squarewave pulses from the clock 28 to the clock input of flip-flop U-5.

With continued reference to FIG. 2, it can be seen that the Q-bar output from flip-flop U5 and the output from line 68 and line 70 are connected as inputs to the AND gate U6. The output of the AND gate U6, on line 78, is provided as one input to AND gate U7. Device 80 provides a slight delay in the signal on line 30 so that the signal on line 84, which is an input to the AND gate U7, is delayed relative to the signal emanating from clock 28. When both inputs to AND gate U7 are logically high, an output signal on line 90 is provided to a delaying device 94. The delaying device 94 can comprise any type of circuitry or component which delays the signal on line 90 by approximately 10 microseconds. The delayed output is provided on line 98 which is connected to the clock inputs of flip-flops U13, U18, U19 and U20. The input of flip-flop U13 is connected to a receiving circuit 100 which provides a high signal on line 102 when a light sensitive component of the photoelectric sensor is receiving a light pulse. The signal on line 90 is also used to energize a light source of the photoelectric sensor. Therefore, if a signal on line 98 is coincident with the receipt of a signal on line 102, a Q output from flip-flop U13 is provided on line 104. By normal operation of the flip-flop U13, the Q-bar output of flip-flop U13 is caused to be logically low in response to this coincident receipt of signals on lines 98 and 102.

As can also be seen in FIG. 2, two 4-input AND gates, U10 and U11, are connected to the Q-bar outputs of all four of the flip-flops, U13, U18, U19 and U20. The status of the outputs of the AND gates will be determined by the current state of the four flip-flops. If, for example, no light pulse signal had been received on line 102 for more than four preceding pulses on line 98, all of the inputs to AND gate U10 would be low and all of the inputs to AND gate U11 would be logically high. Under these conditions, flip-flop U8 would provide a low signal on line 110 indicating that light is not being received by the light sensitive component of the photoelectric sensor. When the first flip-flop U13 receives an initial light pulse on line 102, the change in status of the two outputs of flip-flop U13 would cause AND gate U10 to have one logically high input and three logically low inputs and would also cause AND gate U11 to have one logically low input and three logically high inputs. Under these conditions, both AND gates would provide low output signals to the EXCLUSIVE-OR gate U9 which, in turn, would provide a low signal on line 64 to cause multiplexer U4 to select the high frequency output of line 58 as its output on line 68. In other words, if the outputs of the four flip-flops, U13, U18, U19 and U20, are not identical to each other, a high frequency pulse rate is selected on line 68. Therefore, during periods of transition when the four flip-flops are not identical to each other, the frequency of pulses is increased to permit the photoelectric sensor to more rapidly determine whether or not a true status change is occurring.

In FIG. 2, it can be seen that the four flip-flops are arranged in association with each other to store the statuses of the previous four consecutive inputs on line 102 which are coincident with pulses on line 98. In this way, four identical outputs of the four flip-flops will cause one of the two four-input AND gates to be logically high and the other logically low. This will provide a logically high signal on line 64 to slow the frequency of pulses on line 68 and, in turn, on line 98. Whenever the four flip-flops are not identical to each other in their output status, a low signal on line 64 will select the high frequency option on line 68.

With reference to flip-flop U8, the output on line 110 is logically high if AND gate U10 provides a logically high output which is coincident with a logically low output from AND gate U11. Conversely, if AND gate U11 provides a logically high output while AND gate U10 provides a logically low output, the output on line 110 will be low. Therefore, the output of flip-flop U8 indicates the status of the photoelectric sensor and, therefore, indicates whether or not the light beam emanating from the light source is being consistently received by the light sensitive component. When four consecutive statuses on line 102 are identical to each other, the pulse frequency is slowed to conserve energy. This is true whether the four consecutive status are indicative of light being received or light not being received. As soon as the four preceding pulses on line 98 do not result in identical statuses on line 102, the nonuniformity of the four flip-flops causes the EXCLUSIVE-OR gate U9 to provide a low signal on line 64 in order to increase the rate at which the light source is energized in order to rapidly determine whether or not a change in the status has occurred. This permits a rapid determination of whether or not the light path has been broken or reinstituted.

Figure 3:
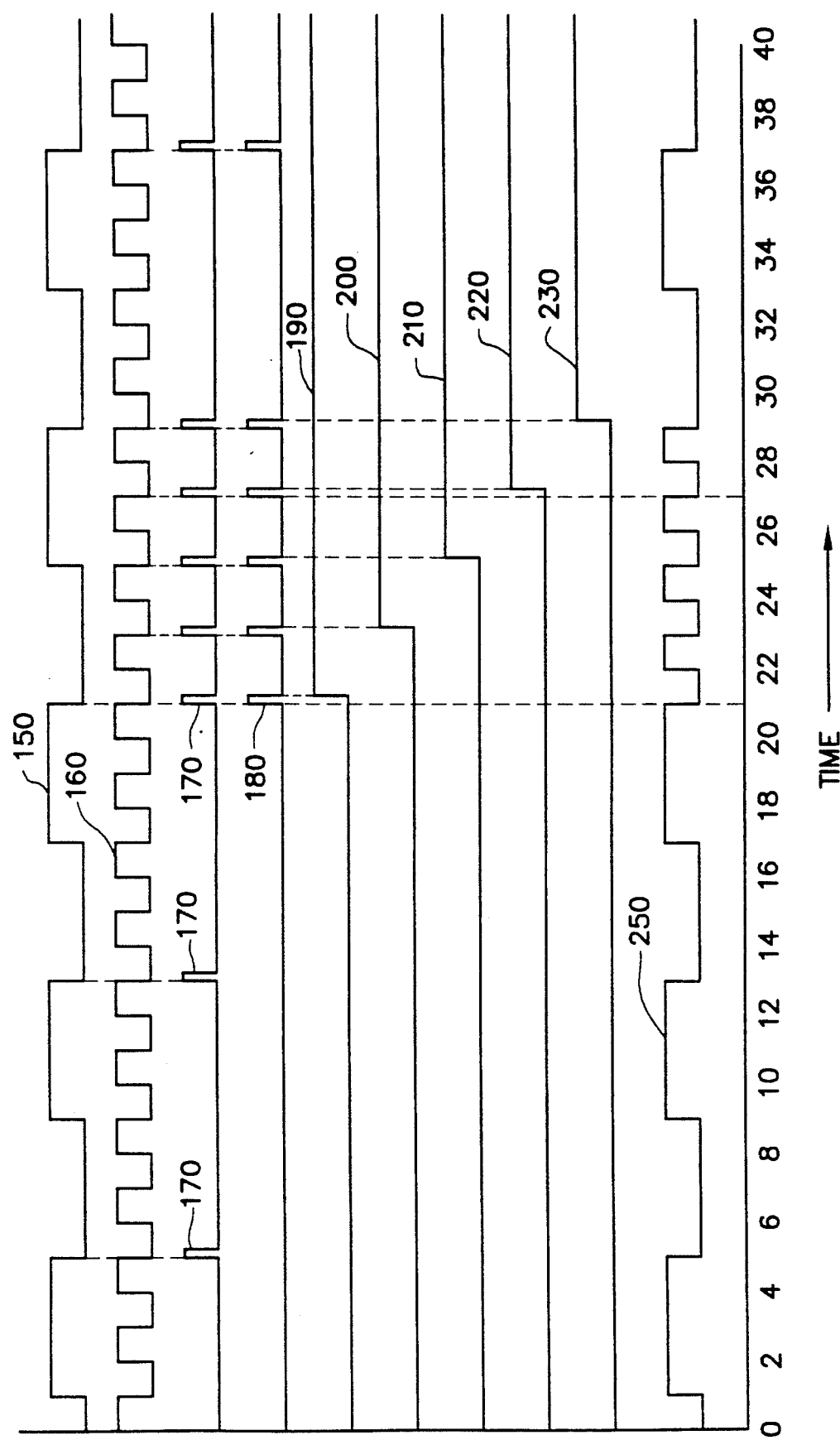
FIG. 3 illustrates a time-based signal pattern of various portions of the circuit shown in FIG. 2 during an initial receipt of light pulses.

FIG. 3 illustrates a time-based series of signals that represent various portions of the circuit in FIG. 2. For example, signal 150 represents the slow frequency on line 68 and signal 160 represents the fast signal on line 68. Beginning at time zero, it can be seen that the pulses 170 on line 98 are occurring at the slower of the two possible frequencies on line 68. This would represent the situation where all four flip-flops, U13, U18, U19 and U20, in FIG. 2 are identical in status. For purposes of this example in FIG. 3, it will be assumed that no light pulses have been received on line 103 for at least four consecutive pulse periods and, in addition, the output signal on line 110 is logically low.

With continued reference to FIGS. 2 and 3, it can be seen that at time period 21, a input signal 180 is received on line 102 coincident with a pulse 170 on line 98. Through the operation of the four flip-flops, two four-input AND gates and EXCLUSIVE-OR gate described above, the signal on line 64 is logically low and the fast frequency is selected on line 68. This causes the pulses 170 on line 98 to coincide with pulses 160 rather than with pulses 150. As can be seen in FIG. 3, this causes pulses 170 to occur at a more rapid rate. Signal 190 represents the Q output of flip-flop U13, signal 200 represents the Q output of flip-flop U18, signal 210 represents the Q output of flip-flop U19 and signal 220 represents the Q output of flip-flop U20. When four consecutive light pulses 180 are received on line 102 in coincidence with pulses 170 on line 98, the output signal 230 on line 110 of flip-flop U8 becomes logically high. In FIG. 3, signal 250 is provided to indicate the type of signal represented on line 68 as an output from multiplexer U4. Comparing signal 170 with signals 150 and 160, it can be seen that signal 170 is triggered by the trailing edge of the selected one of the other two signals.

Figure 4:
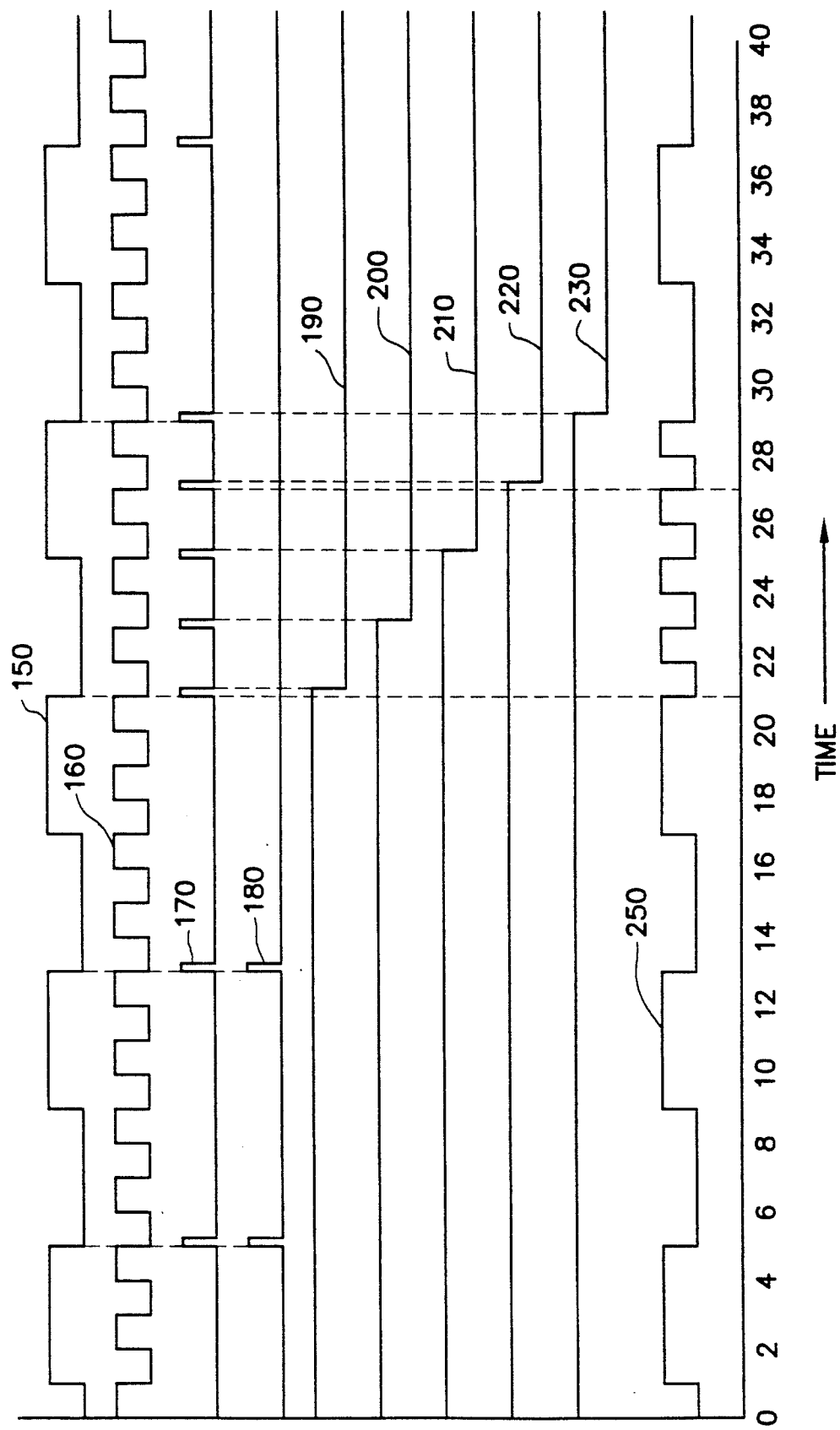
FIG. 4 illustrates a time-based series of signals of representative portions of the circuit in FIG. 2 during the initial absence of a light signal from a light source.

FIG. 4 illustrates the sequence of signal changes that occurs when the photoelectric sensor initially fails to receive a signal on line 102 coincident with the pulse on line 98 after having received at least four consecutive signals on line 102 coincident with previous pulses on line 98. In other words, after having an unobstructed light path for at least four pulses, the light path is broken by an object moving between the photoelectric sensor and the reflective object. This occurs at time period 21 in FIG. 4. When flip-flop U13 first receives a low input from line 102 coincident with a pulse on line 98, the signal on line 64 is caused to become logically low and the faster frequency is provided on line 68. The output of flip-flip U13, represented by signal 190, goes low initially while the other three flip-flops maintain their logically high outputs. Sequentially, signals 200, 210 and 220 become logically low and, after all four flip-flops have changed status, output signal 230 on line 110 goes low.

With reference to FIGS. 3 and 4, it can be seen that the signal pulses 170 are increased in frequency only during the transition period when all four flip-flops are not identical in status, either with logically high or logically low outputs. Immediately after all four of the flip-flops change state, as represented at time period 27, the pulses 170 return to their slower rate. In both FIGS. 3 and 4, it can be seen that energy is conserved by the low frequency between time periods zero and 21 and between time periods 27 and 40. However, it can also be seen that the higher frequency, between time periods 21 and 27, is available to rapidly determine the change of status of the light path, either from obstructed to unobstructed or from unobstructed to obstructed.

Although the present invention has been described in detail and illustrated with particular specificity, it should be understood that alternative embodiments are within its scope. For example, the present invention does not require that the light source and light sensitive component be housed within the same structure. In addition, a light emitting diode is not required in all embodiments of the present invention and the light sensitive component need not be a photodiode as specified above.

The embodiments of the invention in which an exclusive property or right is claimed are defined as follows:

1. A photoelectric sensor, comprising:
   a light source;
   means for causing said light source to be energized and deenergized at a preselected rate to provide a series of light pluses emanating from said light source;
   a light sensitive device disposed in light transmission relation with said light source;
   means for determining whether said light sensitive device is receiving one of said light pulses when said light source is energized, said determining means having an output signal which is representative of a coincident receipt of one of said light pulses when said light source is energized; and
   means for changing said preselected rate in response to a change of said output signal during one energization of said light source from a previous energization, said changing means comprising a first means for selecting a first rate when said output signal is generally identical for a preselected number of energizations of said light source and a second means for selecting a second rate when said output signal is not generally identical for said preselected number of energizations of said light source, said first rate being a higher frequency than said second rate.

2. The sensor of claim 1, wherein:
   said changing means comprises a plurality of flip-flops.
3. The sensor of claim 1, further comprising:
   means for selecting said first and second rates.
4. The sensor of claim 1, further comprising:
   means for reflecting said light pulses emanating from said light source toward said light sensitive device.
5. The sensor of claim 1, wherein:
   said light source and said light sensitive device are disposed in a common housing structure.
6. The sensor of claim 1, wherein:
   said light source is a light emitting diode.
7. The sensor of claim 1, wherein:
   said light sensitive device is a photodiode.
8. A photoelectric sensor, comprising:
   means for generating a series of electrical pulses;
   means for energizing a light source in response to each one of said series of electrical pulses;
   means disposed in light transmission relation with said light source for receiving light pulses from said light source coincident with said electrical pulses;
   means for storing a preselected number of sequential output signals from said receiving means, each of said output signals being representative of the presence or absence of incident light on said receiving means coincident with one of said electrical pulses; and
   means for changing the frequency of said series of electrical pulses in response to a status of a preselected number of sequential ones of said output signals said first rate being a higher frequency than said second rate.
9. The sensor of claim 8, wherein:
   said storing means comprises a plurality of flip-flops.
10. The sensor of claim 8, wherein:
    said light source is a light emitting diode.
11. The sensor of claim 8, wherein:
    said receiving means is a photodiode.
12. The sensor of claim 8, wherein:
    said light source and said receiving means are disposed in a common housing structure.
13. The sensor of claim 8, further comprising:
    means for reflecting light from said light source toward said receiving means.
14. The sensor of claim 8, wherein:
    said changing means comprises two AND gates connected in electrical communication with said storing means.

* * * * *